Figure 1:
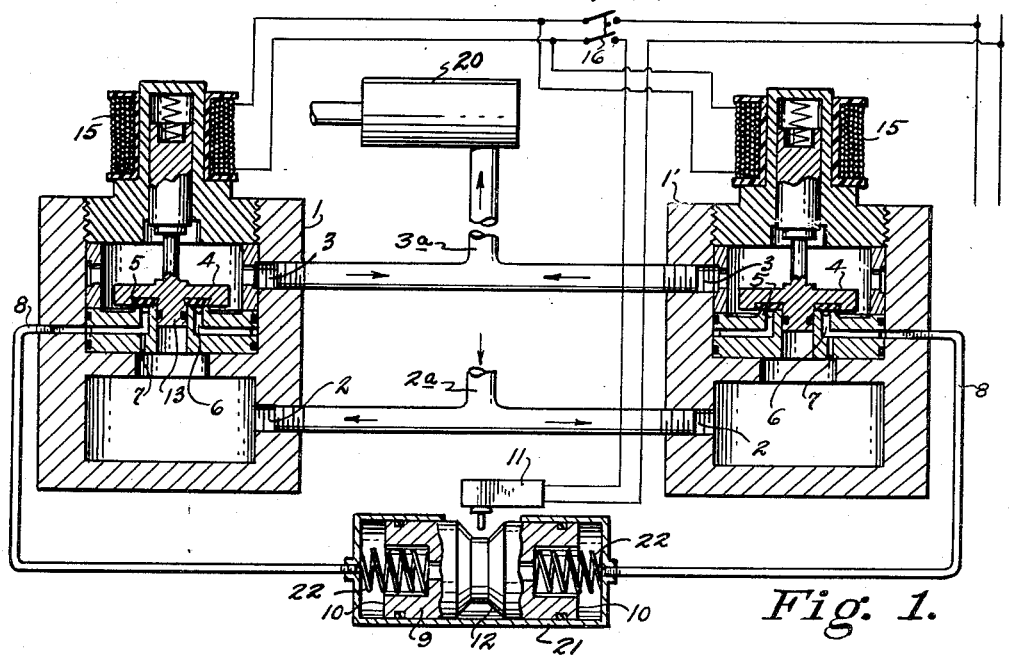

Oct. 23, 1962     E. RUCHSER     3,059,621
PRESSURE CONTROL MECHANISM
Filed Dec. 19, 1960

INVENTOR.
ERICH RUCHSER
BY
AGENT.

United States Patent Office 3,059,621
Patented Oct. 23, 1962

3,059,621
PRESSURE CONTROL MECHANISM
Erich Ruchser, Meimsheim, Wurttemberg, Germany, assignor to Erich Herion, Stuttgart-Frauenkopf, Germany
Filed Dec. 19, 1960, Ser. No. 76,720
Claims priority, application Germany Dec. 21, 1959
10 Claims. (Cl. 121—38)

The present invention relates to a pressure control mechanism for operating and controlling one or more pressure-consuming apparatus, especially the clutch and brake of a press, which are to be operated simultaneously by means of control valves. The control valves may be controlled directly or by means of auxiliary valves and may consist of two individual valves which are connected in parallel and are combined to form a double valve. Each double valve may be connected to only one pressure-consuming apparatus and provided with movable valve members which are adapted to open and close associated valve ports. These valves are connected to each other, preferably at their outlet sides, by pressure comparison means which are capable of comparing the pressures in each valve and are adapted, upon the occurrence of a difference between these pressures, for example, as a result of erroneous operation of the valves or a failure of one of the valves to open fully, to act upon suitable control or switch means for stopping the operation of the pressure-consuming apparatus.

In existing control mechanisms of this type, it is frequently found that the pressure-comparison means can be actuated so as to actuate the means for stopping the operation of the pressure-consuming apparatus only after a predetermined movement of the valve members of, for example, 0.5 mm. Thus, the entire control mechanism may continue to operate even though one of the valves no longer closes tightly, for example, because of a small defect on the valve member or seat of that valve or because a small solid body in the pressure medium settles between the valve member and seat. This is especially annoying in the case of valves in which the sealing action of the valve member on the seat is subject to change when in operation for a long period so that a leak develops gradually.

It is an object of the present invention to provide a valve control mechanism which is directly responsive to any defect in the operation of the valves, even in the closed or sealing position of the movable valve members.

In accordance with an important aspect of the invention, the supply of pressure to the pressure-consuming apparatus is automatically interrupted in the event of a failure in operation or erroneous operation of one of the control valves by providing each valve with a channel which opens at the valve seat of the valve and is connected by a by-pass of a smaller cross section to the pressure inlet side of the valve, and by connecting the channels of both valves to a pressure-comparison element which is actuated by a difference between the pressures in both channels to operate a control member or switch for halting operation of the pressure-consuming apparatus or of the entire machine containing such apparatus.

The part of each of the above mentioned channels which opens directly at the stationary valve seat of the related valve is preferably annular and coaxial with the valve seat. The required differential pressure for actuating the pressure-comparison element can occur, when the movable valve members are in their closed position, only if the valve members fail to seal tightly or if one of them is not actuated at all.

Another feature of the invention consists in providing the movable valve member of each valve with a piston-like projection which extends into, and closes the pressure inlet channel of the valve before the valve member engages the valve seat during its closing movement. In this manner it is possible to more easily and accurately determine a difference in presusre at the valve members themselves as soon as even a minor leak occurs thereon.

In the event that the control valves consist of three-way valves for a pressure-consuming apparatus which is acted upon in one direction or in opposite directions, both valve seats of each valve are provided with channels, as described above. The second channel of each valve may then control an additional pressure-comparison element or it may be connected by a suitable valve for example, a check valve, to the same comparison element which compares the pressures in the channels leading to the first valve seats.

The pressure-comparison element which is connected to the above-mentioned channels of both main valves preferably consists of a cylinder having a double piston slidable therein and acted upon, at its opposite ends, by the pressures in the channels of the two valves. The two ends of the piston may also be connected by a throttling passage which, if desired, may also be adjustable in size and serves to balance smaller fluctuations in the pressures so that these fluctuations will not affect the control member or switch which is adapted to shut off the main controls of the machine.

The above, and other objects, features and advantages of the present invention, will become more clearly apparent from the following detailed description of illustrative embodiments thereof, particularly when the same is read with reference to the accompanying drawings, in which—

Figure 2:
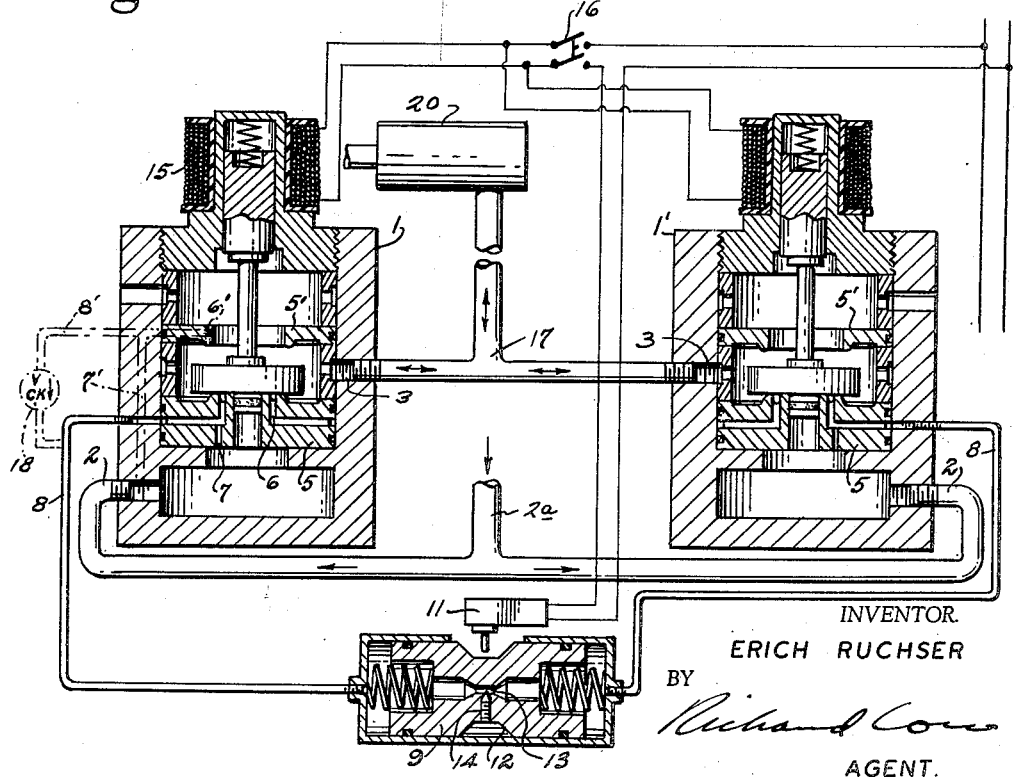

FIGURE 1 is a diagrammatic elevation view, largely in cross section, of a control unit according to the invention for two individual two-way valves which are to be actuated simultaneously; while FIGURE 2 is a similar view of a control unit according to the invention for two individual three-way valves which are also to be actuated simultaneously and may also be connected to each other so as to act upon a single pressure-consuming apparatus.

Referring first to FIGURE 1 of the drawings, it will be seen that two two-way valves 1 and 1' are each provided with an inlet 2 which is to be connected by a conduit 2a to a source of pressure, and an outlet 3 which is to be connected by a conduit 3a to a pressure-consuming apparatus, for example, the operating cylinder 20 of a press. Each valve 1 and 1' contains a valve member 4 which is movable relative to a stationary valve seat 5 to open and close the valve port therein. Both valve members 4 are actuated simultaneously by solenoids 15 which are controlled by a single switch 16.

Each valve seat 5 contains the open end of an annular channel 6 having a cross-sectional area substantially larger than that of a by-pass 7 which connects the main inlet 2 with channel 6. Channels 6 of both valves therefore terminate in the direction of flow toward the pressure-consuming apparatus, and both of them are connected by conduits 8 to a pressure-comparison element adapted to compare the pressures in the channels 6 of valves 1 and 1', and which preferably consists of a cylinder 21 in which a double piston 9 is slidable. If both valve members 4 seal tightly and are properly actuated simultaneously with each other, no differential pressure will act upon one or the other end surface 10 of piston 9 and this piston will be maintained in its central position by means of springs 22. In the event, however, that a differential pressure acts upon one or the other end surface 10 of piston 9, the latter is moved in one or the other direction and thereby engages with a control member or normally closed switch 11 which, when thus actuated, stops the operation of the valves or of the entire control system, for example, by interrupting the current supply to solenoids 15, as shown, or by shutting off the pressure supply leading to inlets 2.

The actuation of switch 11 by piston 9 may be effected, for example, by providing piston 9 with an annular, central recess 12 having inclined walls and into which an actuating finger of switch 11 extends. The recess 12 preferably is wider than the actuating finger of switch 11 so that the inclined walls of recess 12 engage the actuating finger of switch 11 to open the latter only upon movement of piston 9 a predetermined distance from its central position. The operation of the arrangement shown in FIG. 1 is as follows:

If a leak occurs between the seat 5 and valve member 4 of valve 1, a drop in pressure occurs in the direction toward outlet 3 since the amount of pressure which is supplied through the smaller inlet by-pass 7 is limited in accordance with the minimum pressure at which the apparatus is capable of functioning. The pressure transmitted through the conduit 8 from valve 1 to the left side of piston 9 is then lower than that transmitted to the right side thereof since the full control pressure passes through the other conduit 8 from the smaller inlet by-pass 7 of valve 1'. Piston 9 will then be moved accordingly and act upon control member or switch 11 to open the latter and thereby prevent energizing of solenoids 15.

If one of the valves becomes defective or does not operate simultaneously with the other valve, or if the operating element of one valve, for example, the solenoid fails to function so that the respective valve member remains in its lower or closed position, while the valve member of the other valve is opened, the double piston 9 will likewise be actuated and act upon the control member 11 since a decreased pressure will be transmitted by the conduit extending from the open valve, while the full control pressure will be transmitted by the other conduit 8.

In order to sense any pressure increase or decrease still more accurately while the valve members 4 are substantially in their closed position, each valve member 4 is preferably provided with a pistonlike portion 13 which extends slidably into the cylindrical valve port encircled by the seat 5 and is provided with sealing means.

According to a second embodiment of the invention, as illustrated diagrammatically in FIGURE 2, each valve 1 and 1' is in the form of a three-way valve and both valves may be connected in parallel and operated simultaneously. For example, the outlets 3 of both valves may be connected to a line 17 leading to a single pressure-consuming apparatus 20, while the pressure inlets 2 are connected to a conduit 2a extending from a source of pressure (not shown).

In this embodiment, the valve seat 5 of each valve also provided with a channel 6 which is of a considerably larger cross-sectional area than that of the inlet by-pass 7 and is connected by a conduit 8 to a pressure-comparison element with a double piston 9. However, in this case the two conduits 8 are connected to each other, preferably by providing this double piston 9 with a connecting orifice 13 which is adjustable by a needle valve 14 and which serves as a throttling passage. The needle valve 14 is adjusted so that orifice 13 has a cross-sectional size considerably smaller than the cross-sectional size of by-passes 7. In this manner it is possible, preferably by an adjustment of the size of the throttling orifice 13 between conduits 8 on piston 9 itself, to compensate for certain small fluctuations or movements of the piston which may be due, for example, to the slower action of one valve as compared with the action of the other valve, or even to permit minor differences in the movements of the valves without danger that the control member or switch 11 will be actuated by piston 9.

If the safety control is to be responsive to faulty sealing or operation of each valve with respect to its upper seat 5, then the upper seat of each of valves 1 and 1' is also provided with a similar channel 6' which is connected by a by-pass 7' of a smaller cross-sectional size, and also by a conduit 8' to piston 9, as shown in broken lines on FIG. 2. In this case, a check valve 18 is to be provided between conduits 8 and 8' of each valve 1 and 1'.

Although my invention has been described with reference to the illustrated preferred embodiments thereof, it is to be understood that the invention is in no way limited to the details of such embodiments, but is capable of numerous modifications within the scope of the appended claims.

Having thus fully disclosed my invention, what I claim is:

1. A safety control mechanism for controlling the operation of at least one pressure-consuming apparatus, particularly of a press, comprising two valves, each having a pressure inlet adapted to be connected to a source of pressure, a pressure outlet adapted to be connected to said apparatus, a stationary valve seat interposed between said inlet and said outlet and having an inlet port connected to said pressure inlet, a movable valve member adapted to engage with and disengage from said seat to respectively close and open said inlet port, means for moving said valve members of both valves simultaneously, each of said valves having passage means opening at said valve seat and adapted to be closed by said valve member when said valve member engages with said valve seat, a by-pass connecting said passage means with said pressure inlet and having a cross-sectional area substantially smaller than that of said passage means so that, when said valve member properly engages said valve seat, the pressure in said passage means is maintained at the same pressure as at said pressure inlet through said by-pass, while disengagement of the valve member from the valve seat opens said passage means to drop the pressure in the latter to an extent beyond the ability of said by-pass to restore the pressure, pressure-comparison means for comparing the pressures in said two valves, a conduit connecting said passage means of each of said valves to said comparison means so that, when a difference of pressure occurs in said condiuts, said pressure comparison means is actuated for interrupting the flow of pressure to said apparatus.

2. A safety control mechanism as in claim 1; wherein said passage means of each valve is in the form of an annular channel opening at said valve seat and concentric with the latter.

3. A safety control mechanism as in claim 1; wherein each of said valves is a three-way valve having inlets and outlets connected in parallel to each other, said outlets also being connected to at least one pressure-consuming apparatus.

4. A safety control mechanism as in claim 1; wherein said means for moving each of said valve members comprises a solenoid connected to the related one of said valve members and electrical means for connecting and disconnecting said solenoid to a source of current; and wherein said comparison means includes means for disconnecting said electric means from the source upon a difference in the pressures in said conduits.

5. A safety control mechanism as in claim 1; wherein said comparison means comprises a cylinder, a double piston slidable within said cylinder, and resilient means for normally maintaining said double piston in a substantially central position within said cylinder; said conduits being connected to said cylinder so that the pressures in said conduits act to move said piston in opposite directions.

6. A safety control mechanism as in claim 5; further comprising means forming a throttling passage connecting said conduits and having a cross-sectional size smaller than that of each of said by-passes for balancing minor fluctuations in the movements of said double piston.

7. A safety control mechanism as in claim 6; wherein said throttling passage extends through said double piston and connects the opposite ends thereof.

8. A safety control mechanism as in claim 7; further comprising means for adjusting the cross-sectional size of said throttling passage.

9. A safety control mechanism as in claim 1; wherein each of said valves is a three-way valve having two valve seats extending around valve ports adapted to be alternatively opened and closed by said valve member, said passage means opening at each of said valve seats, and each passage means having a conduit extending therefrom to said comparison means and a by-pass connected to said pressure inlet and a check valve interposed between the two conduits extending from each three-way valve.

10. A safety control mechanism as in claim 1; wherein said movable valve member of each valve has a piston-like projection thereon adapted to extend into and to slide within said inlet port and to close said port before said valve member engages with said valve seat.

References Cited in the file of this patent

UNITED STATES PATENTS

| | | |
|---|---|---|
| 2,013,102 | Ledbetter | Sept. 3, 1935 |
| 2,636,111 | Bennett | Nov. 21, 1944 |
| 2,744,369 | Di Tirro | Dec. 18, 1956 |
| 2,825,362 | Hicks | Mar. 4, 1958 |
| 2,906,246 | Di Tirro et al. | Sept. 29, 1959 |